United States Patent

[11] 3,623,055

[72] Inventor Yasuhiko Sakurai
 Kariya-shi, Japan
[21] Appl. No. 805,127
[22] Filed Mar. 7, 1969
[45] Patented Nov. 23, 1971
[73] Assignee Nippon Denso Company Limited
 Kariya-shi, Japan
[32] Priority Mar. 11, 1968
[33] Japan
[31] 43/8885

[54] DEVICE FOR INDICATING DISCONNECTION OF LIGHTING MEANS IN AUTOMOBILE
4 Claims, 4 Drawing Figs.

[52] U.S. Cl. .................................................... 340/251,
 315/77, 315/130, 340/80
[51] Int. Cl. .................................................... H05b 37/03
[50] Field of Search .................................................... 340/52, 54,
 55, 67, 72, 73, 74, 81, 82, 83; 307/251, 132;
 315/129, 130, 133, 136; 317/155.5; 335/59, 63,
 180–182

[56] References Cited
 UNITED STATES PATENTS
3,099,756 7/1963 Penfold et al. .................. 307/132 MR
3,231,788 1/1966 Smith et al. .................... 317/155.5 X
3,500,315 3/1970 Shimada ......................... 340/82
3,504,338 3/1970 Breece ........................... 340/82 X

*Primary Examiner*—John W. Caldwell
*Assistant Examiner*—Kenneth N. Leimer
*Attorney*—Cushman, Darby & Cushman ABSTRACT: A device for indicating the disconnection of lighting means in an automobile which insures accurate indication in spite of normal lighting load current variations caused by filament temperature changes, operation sequences, etc. The device includes at least one indicator connected to a power source through a normally closed relay contact that is held open by the normal light load current when there are no disconnected or nonfunctioning lights. The relay coil includes a current coil for carrying the load current and a voltage coil connected in series with a capacitor to cumulatively add to the magnetomotive force of the current coil during an initial period when the light circuit is first switched on to thereby insure an initial opening of the normally closed relay contacts even if some of the light load is disconnected or nonfunctional. In this manner, the normal current variations during the initial period of operation do not cause an erroneous malfunction indication but, rather the current in the current coil after the initial time period is effective to cause accurate malfunction indications.

INVENTOR
Yasuhiko Sakurai

BY Cushman, Darby & Cushman
ATTORNEYS

DEVICE FOR INDICATING DISCONNECTION OF LIGHTING MEANS IN AUTOMOBILE

BACKGROUND OF THE INVENTION

1. Field of the Invention

This invention relates to a disconnection-indicating device for informing the driver of a failure in the lighting means in an automobile or the like due to disconnection or like trouble.

2. Description of the Prior Art

Lighting means in an automobile includes headlights, sidelights, taillights, stoplights, backup lights, license plate lights, turn signal lights and the like. In regard to these lights, it has been prior practice to equip only turn signal lights with the function of indicating the occurrence of disconnection trouble in the lamps. However, recent rapid popularization of automobiles has resulted in an increase in traffic accidents and thus poses a serious social problem. Among the traffic accidents brought about by automobiles, accidents due to faulty lighting means are often involved with damage to people and this condition must therefore be prevented before it occurs. The faulty lighting means must immediately be indicated and be repaired to its normal operating state or the driver is liable to be punished by the police indicating disconnection this sense, the necessity of providing a device for indicating disconnection trouble of lighting means has been progressively recognized.

An indication device of the kind described above is disclosed, for example, in Japanese Utility Model Publications No. 9432/1959. According to the disclosure, lighting means $L_1$ and $L_2$ are grounded at one terminal thereof, and the other terminal of the lighting means $L_1$ and $L_2$ is connected through a current coil 3 and a switch 2 with a power supply 1 as shown in FIG. 1. The switch 2 is interlocked with a switch 2' which is connected with an indication lamp or indicator 5 through a normally closed contact 4 which is driven by magnetic force caused around current coil 3. However, the indication device having such a structure is subject to various limitations in practical use since a decrease in the load current of the lighting means is detected by the combination of the current coil 3 and the normally closed contact 4 driven by magnetic force produced by the current coil 3. More precisely, the lighting means used in the device of this kind includes generally a plurality of incandescent lamps which exhibits a very great difference in temperatures between the deenergized state of the lamp and the energized state. In the early stage of energization of the lamp, there flows an excessively large current which is from 10 to 20 times the regular energizing current depending on the specification of the lamp as well as the conditions of the circuit including the lamp. The excessively large current occurring in the early stage of lamp energization is generally referred to as overflow current. The overflow current either does not flow at all or it takes on a relatively smaller value such as only two or three the regular energizing current when the lamp is energized after a short interruption thereof or when the lamp is preheated by a dark current. Those in the art will appreciate that the load current of the lamp has such a peculiar property.

Suppose that the operating current (that is, the current which makes the normally closed contact 4 open) of the simple current relay shown in FIG. 1 is slightly smaller than the rated current of the lamp load. In such a case, the current relay is operated by the starting overflow current when switching the lamp load "on" thereby making the normally closed contact 4 open even if one of the lamps is disconnected; once the normally closed contact 4 is open, it can be kept in its open position by a holding current which is usually much smaller than the operating current; therefore, the normally closed contact 4 thus urged to its open position by the overflow current occurring in the state in which one of the lamps flowing through may be held in that position by a reduced load current flowing through the remaining nondefective lamps. Similarly, when the operating current of the current relay; that is, the overflow current of the lamps in a usual application is employed as the base level for detecting any variation in the lamp load, the normally closed contact 4 cannot be driven to its open position in case the switch is intermittently manipulated and there is no overflow current in spite of the fact that the load is normal. Further, when the holding current of the current relay (which corresponds to the magnetomotive force for holding the relay in open position); that is, the regular current of the lamps in their normally loaded state, is employed as the base level for detecting any variation in lamp load; the operating current of the current relay is reached only in the case in which the overflow current appears in the lamps in their normally loaded state. Thus, the relay may perform a defective operation unless the overflow current appears in the normally loaded state of the lamps.

For the reasons described above, the lamp disconnection indication device having a detecting element in the form of a single current coil is inevitably subject to a great limitation in practical use. Since the overflow current appearing in the lamp causes a restriction to the successful detection of the lamp load, a detection device which is completely free from the effect of the overflow current will function more satisfactorily.

The voltage load current characteristic of a 20-watt 12-volt lamp is shown in FIG. 2. As seen in FIG. 2, the load current of the lamp varies generally in proportion to the 0.56th power of the voltage and thus a variation in the current relative to the voltage is relatively small. In terms of the regular current, the amperage of two lamps at 16 volts is equal to the amperage of three lamps at 7.3 volts. Theoretically speaking, a detecting device, if it is not influenced from the overflow current, can detect at least a load variation equivalent to one-third of the normal load current, even if the supply voltage changes from 10 volts to 15.6 volts as above mentioned.

SUMMARY OF THE INVENTION

It is a primary object of the present invention to provide a device for indicating disconnection of lighting means in an automobile comprising a current coil through which the lead current of the lighting means passes, a voltage coil having a capacitor connected in series therewith, and a normally closed contact adapted to be driven to its open position by the initial attraction force developed by said current and voltage coils, wherein the magnetomotive force for holding the normally closed contact in its open position is selected as the level for detecting any variation in the load.

In accordance with the present invention, a departure from the regular current flowing through the lamps is utilized to detect a disconnection occurring in the lamps so as to provide the ability of detection over a very wide range, and a voltage coil is provided to increase the initial magnetomotive force so that the device can operate reliably without being affected by the energized state of the load and independently of the presence or absence of overflow current. Further, in accordance with the present invention, the indication devices may be connected in parallel and a single indicating lamp or indicator may be provided so that a disconnection trouble occurring in any one of the lamps of many systems can be detected and indicated on the single indicating lamp or indicator. Up to three lamps can be incorporated in the same system. Thus, the disconnection-indicating device of the present invention can be applied to the prior art wiring system of an automobile without modifying the wiring system In accordance with the present invention, a diode is connected in parallel with the voltage coil in a direction opposite to the direction of current flow so that the diode acts to eliminate the ojectionable defective operation of the device due to an abrupt drop of the voltage or the power supply in a short period of time. By virtue of the reliable operation of the device in the manner described above, the devices is very useful as a safety device for an automobile.

DESCRIPTION OF THE PREFERRED EMBODIMENTS

Figure 2:
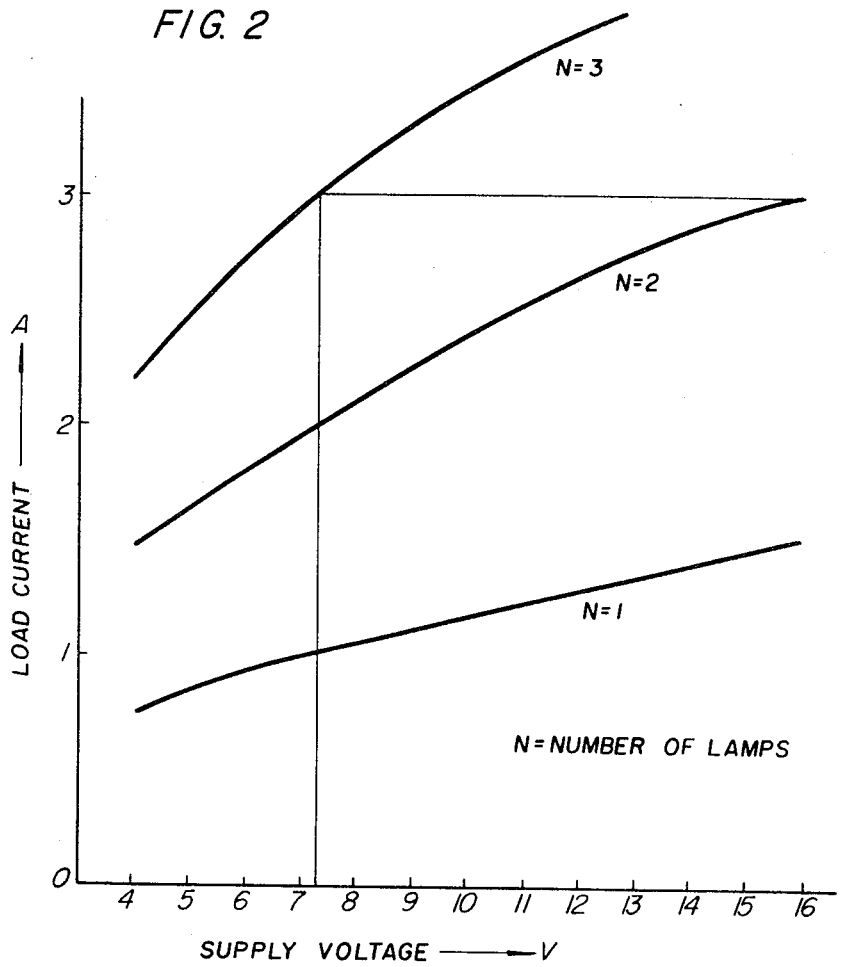
FIG. 2 is a graphic illustrated of the voltage current characteristic of an incandescent lamp load.
Figure 1:
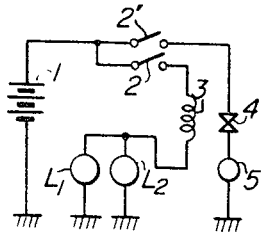
FIG. 1 is an electrical connection diagram of a prior art disconnection-indicating device as described previously.
Figure 3:
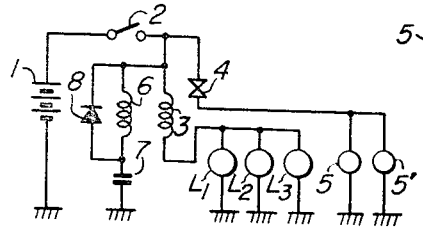
FIG. 3 is an electrical connection diagram of an embodiment of the present invention.

Referring to FIG. 3 wherein like reference numerals are used to denote like parts appearing in FIG. 1, the disconnection-indicating device according to the present invention includes a power supply 1, a switch 2, a current coil 3, a normally closed contact 4, an indicating lamp 5, an indicator 5', a voltage coil 6, an electrolytic capacitor 7, and a diode 8. Lamps $L_1$, $L_2$ and $L_3$ such as stoplights or taillights of an automobile are connected with the current coil 3. The current coil 3 and the voltage coil 6 are arranged to be in the same phase electromagnetically so as to drive the normally closed contact 4 to its open position.

In operation, the switch 2 is closed to supply the voltage of the power supply 1 to the lamps $L_1$, $L_2$ and $L_3$ through the current coil 3 thereby to energize the lamps. At the same time, the capacitor 7 is charged by the current supplied through the voltage coil 6, and the charging current develops an attraction force in the voltage coil 6. More precisely, an attraction force is developed in both the current coil 3 and the voltage coil 6 when the switch 2 is closed, and the charging current for the capacitor 7 produces a large magnetomotive force in the early stage of the closure of the switch 2 thereby to drive the normally closed contact 4 to its open position. Thus, since the normally closed contact 4 is driven to its open position as soon as the switch 2 is closed, the indicating lamp 5 is not energized and the indicator 5' does not operate. After the normally closed contact 4 in its open position it is kept in such a position so long as the magnetomotive force for holding the normally closed contact 4 in its open position is continuously applied. Therefore, the magnetomotive force of this magnitude may be selected as the level for detecting any unusual condition of the load so that the normally closed contact 4 can be kept in its open position with the load current with which all the lamps $L_1$, $L_2$ and $L_3$ are normally energized, while the normally closed contact 4 can be restored to its closed position again when a disconnection occurs in any of these lamps $L_1$, $L_2$ and $L_3$. In this latter case, the indicating lamp 5 is energized or the indicator 5'' is operated to inform the driver of the occurrence of disconnection trouble in the lamps.

Figure 4:
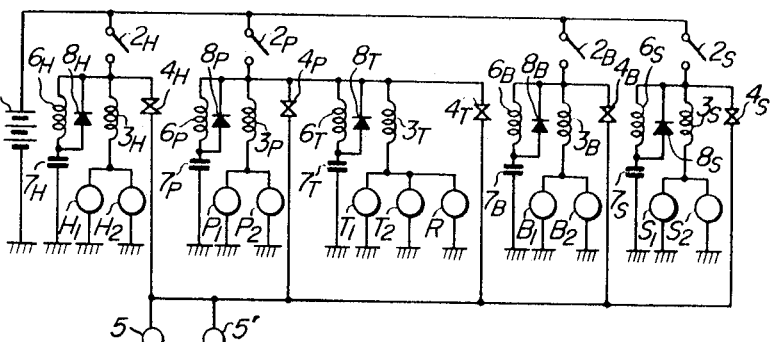
FIG. 4 is an electrical connection diagram of a more practical embodiment of the present invention for use in an automobile.

Referring to FIG. 4 wherein like reference numerals are used to denote like parts appearing in FIG. 3, reference symbols H, P, T, R, B and S designate headlights, parking lights, taillights, a license plate light, backup lights and stoplights, respectively. Suffixes are attached to the reference numerals to clearly show the systems to which the respective elements belong. The diode 8 shown in FIGS. 3 and 4 is provided for the purpose of releasing the attraction force of the voltage coil 6 during the discharge of the capacitor 7. Thus, the diode 8 acts to prevent a defective operation of the device due to an abrupt drop of the voltage of the power supply 1 in a short period of time.

I claim:

1. A device for indicating disconnection or failure of a lighting means in a automobile, said device comprising:
    a plurality of lighting means having a normal load current after an initial energizing period,
    at least one indicator,
    a normally closed relay contact in series circuit with said indicator and a DC power source whereby an indication is given whenever said relay contact is closed,
    a current coil means for providing a first electromagnetic force tending to operate said relay contact from the closed position to an open position, said current coil means being connected between said DC power source and said plurality of lighting means, and
    a voltage coil means for providing a second electromagnetic force in the same sense as said first force also tending to operate said relay contact cumulatively with said current coil means, said voltage means being connected through a capacitor across said DC power source whereby said relay contact is always opened during said initial energizing period,
    said first electromagnetic force produced by the normal load current of said lighting means after said initial energizing period being sightly larger than the electromagnetic force necessary for holding said relay contact in the open position whereby said indication will be given accurately upon even a slight reduction in said normal load current.

2. A device as in claim 1 wherein a diode is connected in parallel with said voltage coil means with the forward diode current normally carried by said voltage coil means to bypass reverse currents in case the DC power source is abruptly reduced.

3. In a light-load-failure-indicating device comprising normally closed relay contacts connected to an indicator and held open by the normal operating current of a lighting load including a plurality of lighting means connected to a DC power source through a current-sensitive coil of the relay whereby a decrease in lighting load current caused by a light failure of a lighting means causes release and closing of the relay contacts to energize the indicator, an improvement comprising:
    a series-connected voltage coil and capacitor combination also connected across said power source,
    said voltage coil being wound on said relay and connected to produce an electromagnetic force in the same sense as that produced by said current coil whereby for an initial time period, the cumulative electromagnetic forces from said voltage coil and said current coil insure an initial opening of said relay contacts even if some of the lighting load is nonoperative, and
    said electromagnetic force produced by a normal lighting load current after said initial time period being slightly larger than the electromagnetic force necessary for holding said relay contacts in the open position whereby said indication will be given accurately upon even a slight reduction in said normal load current.

4. A light-load-failure-indicating device as in claim 3 further comprising a diode connected in parallel with said voltage coil and in a sense opposite to the normal direction of current through said voltage coil to bypass reverse currents in case the DC power source is abruptly reduced.

* * * * *

UNITED STATES PATENT OFFICE
CERTIFICATE OF CORRECTION

Patent No. 3,623,055　　　　　　　　Dated November 23, 1971

Inventor(s) Yasuhiko SAKURAI

It is certified that error appears in the above-identified patent and that said Letters Patent are hereby corrected as shown below:

In the heading the Priority "Mar. 11, 1968 Japan 43/8885" should read --Mar. 11, 1968 Japan 18885/68--.

Signed and sealed this 23rd day of May 1972.

(SEAL)
Attest:

EDWARD M. FLETCHER, JR.　　　　　　ROBERT GOTTSCHALK
Attesting Officer　　　　　　　　　Commissioner of Patents